UNITED STATES PATENT OFFICE.

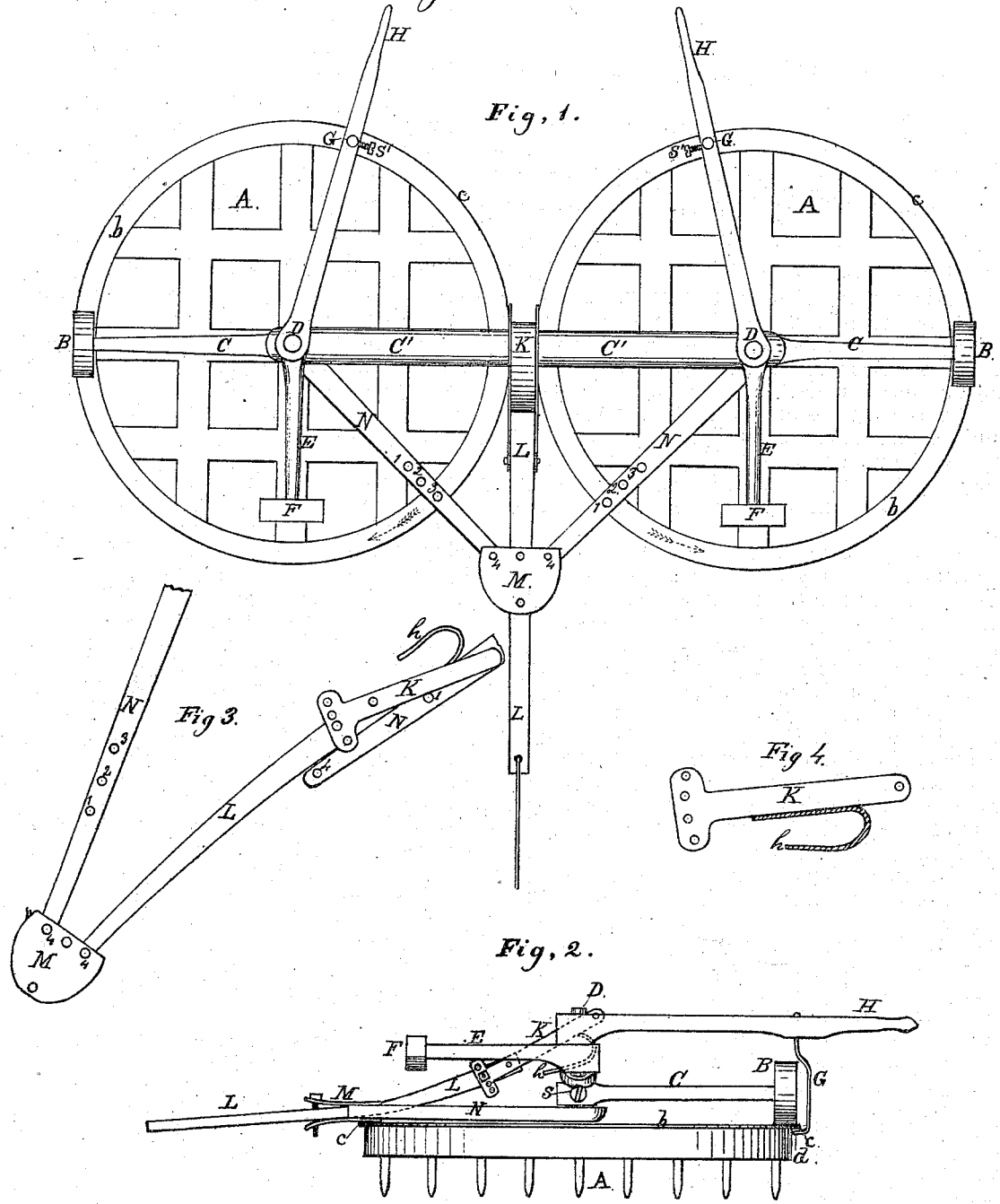

JAMES MATHISON, OF FREMONT, NEBRASKA.

IMPROVEMENT IN HARROWS.

Specification forming part of Letters Patent No. 120,204, dated October 24, 1871.

*To all whom it may concern:*

Be it known that I, JAMES MATHISON, of Fremont, Dodge county, State of Nebraska, have invented a new and improved Rotary Harrow, which is fully described and set forth by the following specification and accompanying drawing, in the different figures of which like letters represent like parts of the invention—

Figure 1 being a top view; Fig. 2, a side elevation; Fig. 3, a view in detail of adjustable bars and clevises; and Fig. 4, a view in detail of clevis.

My invention relates to rotary harrows; and consists, first, of heavy wheels arranged on the top of the harrows, revolving on adjustable axles attached to an upright center-shaft, so that the position of the wheels may be changed for the purpose of causing the harrows to rotate either way; secondly, of weights upon adjustable levers attached to the center-shaft for regulating the depth of the harrows; thirdly, of adjustable rods with hooks attached to the handles for raising and lowering the front and back of the harrows; fourthly, of adjustable clevises and bars for regulating the draft and changing the position of the harrows.

A A are rotary harrows having rims $b$ $b$ made smooth and level upon the top, so that the wheels will readily roll upon them, and provided with flanges $c$ $c$. B B are wheels of cast-iron, or any other suitable material, arranged upon adjustable axles C, which are attached to upright center-shafts D D, and are held in place by the set-screws $s$. E E are adjustable levers attached to the center-shafts, and provided with weights F F, for regulating the depth of the harrows. G is a rod passing through the handle H, and is provided with a hook, $d$, at the bottom, and is held in place by set-screw $s'$. K is a clevis with a hook, $h$, arranged to hook over and slide upon the coupling-bar C', and is attached to the back end of draft-bar L, which passes through and is bolted to clevis M. N N are side draft-bars with holes 1, 2, 3, and 4, and are attached at the rear ends to the center-shafts D, and at the front ends to clevis M.

When the harrows are in motion the parts opposite to the wheels B, as seen in Fig. 1, move forward, rotating the harrows outwardly; and to cause them to rotate the other way, the wheels are changed to the opposite side of the center-shaft by loosening the set-screw till the axle will turn freely upon the shaft; and when the wheels are in the required position, the set-screws are tightened to keep them in place. Any required weight may be attached to the levers E, and they may be adjusted to any position required, to make the harrows take properly to the ground. The harrows are raised and lowered in front and back, as required, by the handles and the adjustable rod G with hook $d$, which catches under the flanges $c$. The draft and position of the harrows are regulated by the adjustable clevises and bars. When they are in position as seen in Fig. 1, the harrows will run side by side; but they may be changed so that one will run partly or entirely behind the other by removing clevises K and bar L from the coupling-bar and front clevis and attaching them as follows, viz.: Attach the front end of bar L to the front clevis M, and the back end of clevis K to bar N in hole 1, 2, 3, or 4. The nearer clevis K is attached to the end of bar N the further one harrow will be thrown behind the other; and when attached at hole 1 one harrow will run entirely behind the other. I dispense with a tongue for the purpose of avoiding the weight upon the horses' necks.

These harrows may be used singly or as many together as can be drawn by one team.

What I claim, and desire to secure by Letters Patent, is—

1. The handles H H, pivoted over the center of each harrow, with adjustable rods G having hooks $c$, arranged and operating substantially as and for the purpose set forth.

2. The draft-pole L, in combination with clevis K, adapted to be applied to either cross-bar C', or to either of the adjustable side bars N N, substantially as and for the purpose set forth.

As evidence that I claim the foregoing as my invention I have hereunto set my hand and seal in the presence of two witnesses.

JAMES MATHISON. [L. S.]

Witnesses:
C. T. CONDIT,
ERNEST OSTENBURG.